March 22, 1966 B. OSHER ETAL 3,241,588
METHOD AND MEANS FOR PROVIDING MULTIPLE WINGS AS A UNIT
Filed Feb. 13, 1962
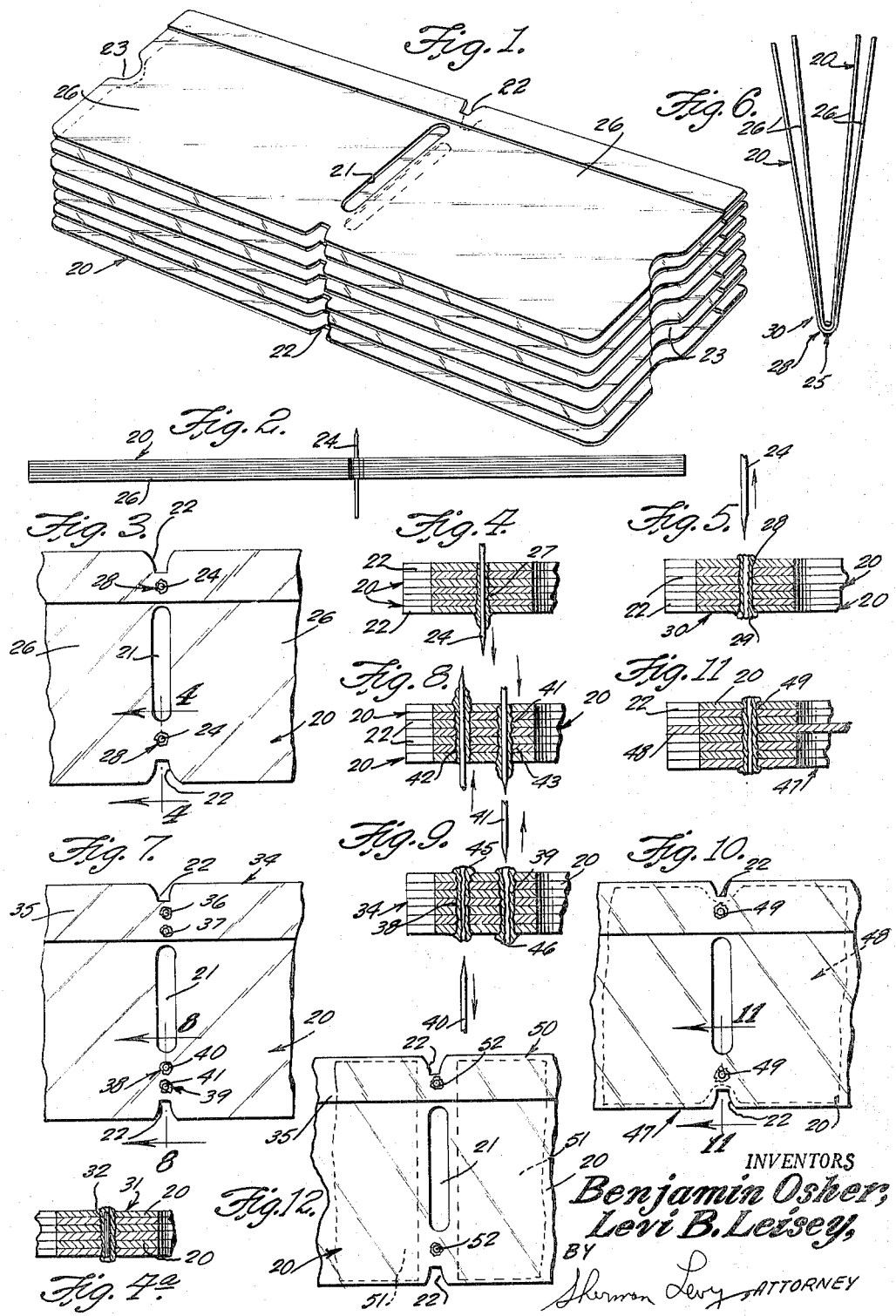
INVENTORS
Benjamin Osher,
Levi B. Leisey,
BY Sherman Levy ATTORNEY United States Patent Office 3,241,588
Patented Mar. 22, 1966

3,241,588
METHOD AND MEANS FOR PROVIDING MULTIPLE WINGS AS A UNIT
Benjamin Osher, Lawrence, N.Y., and Levi B. Leisey, Caparra Terrace, Puerto Rico, assignors, by mesne assignments, to Kleer-Vu Industries, Inc., New York, N.Y.
Filed Feb. 13, 1962, Ser. No. 172,987
1 Claim. (Cl. 150—39)

This invention relates to wing assemblies for wallets and pass cases and the like, and more particularly to a method and means for providing a plurality or multiplicity of such wing assemblies as a unit.

The primary object of this invention is to provide a means whereby a desired number of plastic members such as transparent wing assemblies can be integrally joined together so that a plurality of wing assemblies can be handled or merchandised as a unit or unitary assembly.

A further object is to provide a method of and means for joining together a plurality of members and wherein the members are of the type that can be fused or welded together by inserting a hot member such as a fine hot wire through the members so as to cause portions of the members to melt, whereby the hot member can be subsequently withdrawn or removed to permit the fused material to cool and thus form a bond or seal which serves to retain the multiplicity of members or wings connected together as a unitary set or group to facilitate handling thereof for any desired purpose.

Still another object is to provide such a method and means for providing multiple wings as a unit wherein the present invention is economical to carry out and efficient in operation and wherein the completed assembly is firmly bonded or united, and wherein the method is foolproof in use.

These and other objects of the invention will become apparent from a reading of the following specification and claim, taken together with the accompanying drawing, wherein like parts are referred to and indicated by like reference characters and wherein:

FIG. 1 is a perspective view showing the multiplicity of the wings before they are joined together according to the present invention.

FIG. 2 is a side elevational view illustrating the method of joining the wings together by piercing the wings with a hot wire or needle in intermediate portions thereof so that the wings will be joined in the vicinity of the bend or fold line.

FIG. 3 is a fragmentary top plan view showing the center portion of the wings and showing the location of the points where the needles or the wires go through during the fusing thereof.

FIG. 4 is a sectional view taken on line 4—4 of FIG. 3 and showing how the hot member pierces the material and melts the material.

FIG. 4ª is a view similar to FIG. 4 but illustrating a modification and showing or illustrating how the hot wire can be inserted and left in place.

FIG. 5 is a view similar to FIG. 4 but illustrating the step of withdrawing the hot wire or member and showing how the parts become welded or fused together so that when the hot member is pulled out, a bond or seal is provided.

FIG. 6 is a fragmentary elevational view showing the location of the welds in the vicinity of the bending line of the wings.

FIG. 7 is a fragmentary plan view illustrating a modification wherein instead of using two hot members, a plurality of hot members which may be four wires or the like are inserted through the wings, and wherein certain of the hot members are inserted in one direction while others are inserted in the opposite direction.

FIG. 8 is a sectional view taken on the line 8—8 of FIG. 7 and showing the piercing of the wings by the hot members.

FIG. 9 is a view similar to FIG. 8 but illustrating the withdrawal of the hot members.

FIG. 10 is a fragmentary plan view illustrating a modification wherein an identification card or the like is adapted to be placed between contiguous wings.

FIG. 11 is a sectional view taken on the line 11—11 of FIG. 10.

FIG. 12 is a fragmentary plan view illustrating a further modification wherein separate cards or identification members are arranged on opposite sides of the welds and wherein in FIG. 12 the identification cards may be removed as compared to FIG. 10 wherein the identification card is not removable.

Referring in detail to the drawings, and more particularly to FIGS. 1 through 4 and 5 and 6 of the drawings, the numeral 20 indicated a plurality of wings of a construction which permits use thereof in billfolds, wallets, pass cases, or the like, and for example the wings 20 may have a construction similar to that shown in prior Patents 2,797,461 and 2,828,790 and 2,926,714. The wings 20 each have the same construction and each are adapted to be made of a suitable material such as a suitable transprent acetate type of material, and the wings 20 include intermediate slots or cutouts 21 at an intermediate point as for example as shown in FIG. 1, and the wings 20 are also provided with aligned cutouts or apertures such as the cutouts 22, FIG. 1, whereby portions of a clamping bar such as the clamping bar shown and described in prior Patents 2,797,461, and 2,828,790, and 2,926,714 can be used for retaining the wings in place in a billfold, wallet or the like. The wings 20 may also be provided with finger engaging recesses 23.

According to the present invention there is provided a method of and means for uniting a plurality of the wings together and according to the present invention a hot wire or member such as the member 24 shown in FIG. 2 is adapted to be used to pierce the wings or transparent members, and the piercing member 24 is adapted to be inserted through the wing in the vicinity of the fold or bend line 25, so that for example when the wings 20 are folded and in use as shown in FIG. 6 there is provided the portions 26 for receiving identification cards or the like in the usual manner.

In FIG. 4 there is shown a portion of the wings while the hot member 24 is inserted therethrough so that some of the material melts or fuses as indicated by the numeral 27, and in FIG. 5 there is illustrated the step of removing the member 24 so that the material can cool and harden or become welded as at 28, and a slightly enlarged head or shoulder 29 is adapted to be provided on the wings on the opposite side from which the hot member 24 is withdrawn or removed.

In FIG. 6, the numeral 30 indicates a portion of the united wings which have been joined together according to the present invention.

In FIG. 4ª, the numeral 31 indicates a portion of a modified multiple wing assembly and the multiple wing assembly 31 is adapted to be made in the manner generally similar to that previously described multiple wing assembly except that in FIG. 4ª instead of withdrawing the hot member, a portion of the hot member may be permitted to remain permanently in the wings 20 and the fused or welded material in the vicinity of the wire 33 is indicated by the numeral 32.

Attention is now directed to FIGS. 7, 8, and 9 of the drawings wherein there is illustrated a further embodiment or modification of the present invention wherein the numeral 34 indicates a portion of a multiple wing assembly and wherein each of the wings may be of a type that includes an elongated flange 35, and as shown in FIG. 7, a plurality of weld points 36, 37, 38 and 39 may be provided instead of just having two weld points as shown in FIG. 3. The weld points 36, 37, 38 and 39 are adapted to be formed or provided by inserting hot members such as the members 40 and 41 as shown in FIG. 8, and these members 40 and 41 are adapted to be inserted or pierced in opposite directions relative to each other, and the melted material in FIG. 8 is indicated by the numerals 42 and 43 which results from the insertion of the hot members 40 and 41 respectively. In FIG. 9 the numerals 45 and 46 indicate slightly enlarged heads which result from the withdrawal of the hot members 40 and 41 after the piercing operation is completed.

Referring now to FIGS. 10 and 11 of the drawings, there is illustrated a further modification wherein a portion of the multiple wing assembly is indicated generally by the numeral 47, and it will be seen that the assembly 47 is made by arranging a plurality of wings 20 in superposed relation relative to each other and then inserting a hot member therethrough, and the assembly 47 may be of the type which includes an identification sheet or card 48 which is arranged between certain of the wings 20, and in FIG. 11 the numeral 49 indicated the weld point formed by inserting the hot member and subsequently withdrawing the same. The identification sheet or card 48 thus remains permanently embedded or secured in place between certain of the wings 20.

Attention is now directed to FIG. 12 of the drawings wherein the numeral 50 indicates a further modified multiple wing assembly and the multiple wing assembly 50 includes wings such as the wings 20 which are adapted to have welded or fused points 52, and the numeral 51 indicates identification cards or the like which are adapted to be removably mounted in the wings.

From the foregoing, it will be seen that there has been provided a method and means for joining together a plurality of members such as transparent plastic sheets or wings and wherein by joining together such a multiplicity of wings or other members, such members can be more readily handled and supplied or dispensed as a multiplicity of wings or members have a unitary formation or assembly.

As shown in FIGS. 1, 2, 3, 4, and 5 and 6, the wings 20 are adapted to be of one piece plastic construction, and such wings may have a construction similar to that shown in prior Patents 2,797,461 and 2,828,790 and 2,926,714. These wings are of the type which are used for holding identification cards or other articles therein, and the wings are adapted to be retained in a wallet or the like my means of a clamp bar, such as a clamp bar shown in prior Patents 2,797,461 and 2,828,790 and 2,926,714, and the cutouts 22 provide clearance for the end portions of the clamp bar. The wings 20 can be folded at intermediate portions thereof so that for example the wings 20 can be bent or folded along a line 25 as shown in FIG. 6 so that there is provided the side portions 26 which are adapted to conveniently receive therein the identification cards or other articles.

According to the present invention, there is provided a means for joining or uniting a plurality of the wings 20 together and this is accomplished by arranging the wings 20 in superposed relation as for example as shown in FIG. 2 and then a hot wire or needle or punch as indicated by the numeral 24 is adapted to be inserted through the multiplicity or group of wings 20 and since the members 20 are made of a suitable plastic material which melts when heat is applied thereto, it will seem that as the hot wire 24 pierces the members 20, the material in the vicinity of the wire or member 24 will melt as indicated by the numeral 27 in FIG. 4, and then, as shown in FIG. 5 after this step has been accomplished, the wire or member 24 is withdrawn and the melted material is permitted to cool so as to permit the material to harden wherein there is provided a joint or weld as indicated by the numeral 28 in FIG. 5, and in FIG. 5 the wire or needle is shown being withdrawn in an upward direction away from the welded or joined assembly 30, and upon withdrawal of the wire 24, a small enlargement or shoulder or head portion 29 is provided on the opposite side of unit 30 from which the member 24 is withdrawn, and this formation of the head 29 insures that there will be a more firm bond or seal or weld having a desired position in the wing assembly. It is to be understood that a plurality of such welds or seals 28 are adapted to be provided in each group of wings, and these weld points are adapted to be arranged along the medial or fold line 25 so that the wings 20 will be joined or welded at the proper point.

In forming the welds 28, the hot members 24 may be inserted through the multiplicity of wings 20 by moving the hot members 24 several times through the wings and the same member 24 may be inserted into the wings from the same direction forming both welds 28. However, in FIGS. 7, 8 and 9 there is shown an alternative method and means for uniting a plurality of wings, and in FIGS. 7, 8 and 9 instead of providing two weld points, four weld points as indicated by the numeral 36, 37, 38 and 39 are provided, and in order to help strengthen the weld joint, in FIGS. 7, 8 and 9 a pair of the weld joints may be formed by moving the hot member into and through the wings from one side thereof, while the other pair of weld joints may be formed by piercing the wings from the opposite side thereof. This is illustrated in FIG. 8 for example, where it will be seen that one member or hot wire 40 is adapted to be inserted up through the wing assembly 34, while the hot wire 41 is adapted to be inserted in a downward direction down through the wing assembly 34, and after the material in the vicinity of the members 40 and 41 is melted, the member 40 is withdrawn by moving the same downwardly, and the member 41 is withdrawn by moving the same upwardly, so that there is provided weld points such as the weld points 38 and 39 with slightly enlarged heads and shoulders 45 and 46, which are on opposite sides of the wing assembly.

In the arrangement of FIGS. 10 and 11, a plurality of wings 20 are shown arranged with an identification card or the like as indicated by the numeral 48 between certain of the wings, and the hot wire or member is adapted to be inserted through the contiguous wings of the identification card 48 so as to cause the material to melt in the vicinity of the hot member whereby when this material hardens upon withdrawal of the hot member, the weld point 39 is provided and it is to be noted that the hot members are adapted to pierce the identification card 48 whereby some of the melted material will enter the aperture or opening formed in the card 48 due to the same being pierced by the member whereby the wings 20 and card 48 will become fused together at point 49. It is to be understood that any number of weld points such as weld points 49 can be provided in a particular unitary assembly as desired or required. The card 48 thus becomes integrally bonded to the wings 20 so that the card or sheet 48 is not ordinarily removed from the assembly 47.

In the modification of FIG. 12, an arrangement is provided which is generally similar to the arrangement shown in 10 and 11, but in FIG. 12 instead of having one card 48 extend all the way across between adjacent pairs of wings, a pair of separate cards or sheets 41 are adapted to be arranged in place between adjacent wings, and the weld points 52 are adapted to be formed in the same manner as previously described. That is the weld points 52 are adapted to be formed or provided by inserting hot wires or members into the plastic wings and when the member is withdrawn, the plastic material hardens to fuse together the wings at the point 52. The cards 51 may be of the type which can be removed when desired or required.

In the modification of FIG. 4ª, the assembly 31 may be provided by piercing the wings 20 with a wire or hot member 33 so as to form the weld point 32, and if desired the wire 33 can be suitably cut off and made to remain permanently in the assembly 32.

The parts can be made of any suitable material and in different shapes or sizes as desired or required.

The hot member which is used for piercing the wings may be heated in any suitable manner, and for example the hot member or wire may be heated electrically or it may be heated by non-electrical means.

While the present invention has been described specifically for use in joining together a plurality of transparent wings for use in a wallet or the like, it is to be understood that the principles of the present invention are applicable to other articles, and for examples the method and means set forth herein for joining the multiplicity of members together can be used conveniently and advantageously for welding together or bonding together sheets, transparent articles, plastic members and the like and other members or articles which are made of a material that fuses or melts when contacted by a suitable source of heat.

The present invention is particularly advantageous in the wallet, or pass case field, and the following is given as background information with regard thereto. Heretofore it has been customary in the trade to use many multiples of wings, and at one time two wings were used and at the present time two wings are still used somewhat, but for the most part multiples such as 8, 10, 12 and 15 and even more are used and therefore it is necessary to deliver to users of wings what is known as counted wings. Briefly, if a user or customer would want eight wings for example, it would be necessary to count the eight wings at the machine and insert paper as a divider, and this paper also serves as an identification card or means for dividing the wings. Subsequently, rubber bands were placed around the eight wings in order that they may be inserted quickly into the clamping bar, and consideration has also been given to stapling the eight wings together but of course this is time consuming and costly and not commercially feasible. The primary considerations are to save this user time and money when inserting wings into a pass case, and the present invention solves these problems and is quite simple and for example all that is necessary to do is take a very fine hair wire and get it red hot and insert it through the acetate or other plastic material in the proper area or portion of the wings so as to actually fuse the eight wings together. Thus, there is provided a unit that is actually welded together in an inconspicuous spot and yet so welded that the wings can be taken apart very easily without destroying any wings, and wherein any wing can be replaced and spread apart with ease or facility.

The welding together of the wings can be accomplished in various ways besides the simple way of piercing the wings with a red hot punch or wire, and for example this can be accomplished by using a hypodermic needle provided that the needle is strong enough to pierce the wings. Also, the wings may be sealed ultrasonically or with high frequency welding, but these latter methods are believed disadvantageous because they are somewhat costly and in addition are not adapted to be used with the many multiples that can be pierced by using a red hot needle or wire.

As shown in FIGS. 7, 8 and 9, the pierced holes may be made so that the hot member goes in one direction and then in the opposite direction so that if any of the wings were to part or separate, there is an assurance that the wings would be welded in the opposite side. In other words in FIGS. 7, 8 and 9, wires such as the wires 40 and 41 move in opposite directions relative to each other during the piercing and the withdrawal of the hot members from the wings. Also, paper or identification cards or other objects can be inserted between the wings or positioned around or on the outside thereof and be still in place securely.

It is to be noted that the welding occurs because the acetate or the plastic material becomes a melted soupy mass or substance due to the hot tool or implement, and when the tool or implement is withdrawn the flow of this melted acetate or plastic material cools off quickly and becomes a solid mass at the furtherest end portion, and for example such an end portion is indicated by the numeral 29 in FIG. 5 or by the numerals 45 and 46 in FIG. 9, and this little mass or head or end portion helps hold the parts in place. It is to be noted that if a card is to be inserted between the wings as shown in FIG. 11, the card is held in place by the flow of the soupy mass through the hole in the sections formed in the card 48 by the punch or hot wire or implement. Thus, the soupy mass also flows through the narrow hole or opening in the card and forms an inside weld, and this inside weld is also formed in the other modifications such as that shown in FIGS. 1 through 6 and 7 and 8 and 9.

The method of the present invention for holding wings together is applicable to any material in addition to acetate and for example the present invention can be used when the wings or other members are made of vinyl, polyesters, or the like.

In the modification of FIG. 4ª, the hot wires are left in the material and are cut off after cooling, but as previously stated in the other modifications it is not necessary to leave the hot wire in the material in order to bring about the desired effective bond or seal. Also, if desired very small punched holes may be made in the wings and wherein a piece of melted plastic or rivet or the like can be inserted in such punched holes in order to hold the wings together, but these last named methods are somewhat more costly than the previously described methods. Also, the protrusions or weld points can be of any size or thickness, and the thicker the mass, the stronger the plastic substance will be congealed.

Although certain specific embodiments of the invention have been shown and described, it is obvious that many modifications thereof are possible. The invention, therefore, is not to be restricted except insofar as it is necessitated by the prior art or spirit of the appended claim.

What is claimed:

A stack of wing assemblies for wallets, billfolds, pass cases and the like, said stack comprising a plurality of similar transparent plastic wings that are arranged contiguous to each other in superposed relation with respect to each other, said wings including aligned bend and fold lines intermediate the ends thereof, and means for sealing the wings together at intermediate medial points, said means comprising a plurality of weld points and fused portions that are arranged in aligned relation with respect to each other, and said weld points and fused portions having slightly enlarged heads adjacent the outer surface of the wings, said wings having registering aligned cutouts in the side edges thereof intermediate the ends thereof, said wings also having slots therein which are arranged inwardly of and between the cutouts in the wings, said weld points and fused portions being interposed between said cutouts and slots, and said slots having their longitudinal axes coinciding with the bend and fold lines and being aligned with the cutouts and weld points and fused portions.

References Cited by the Examiner

UNITED STATES PATENTS

| | | | |
|---|---|---|---|
| 1,510,243 | 9/1924 | Perry | 156—252 X |
| 2,545,243 | 3/1951 | Rumsey | 156—251 X |

(Other references on following page)

UNITED STATES PATENTS

| | | | |
|---|---|---|---|
| 2,807,265 | 9/1957 | Oliva et al. | 150—39 X |
| 2,845,975 | 8/1958 | Seamon | 150—39 |
| 2,926,714 | 3/1960 | Osher | 150—39 |
| 2,973,797 | 3/1961 | Sylvester | 156—251 X |
| 2,974,717 | 3/1961 | Lindsay | 156—251 X |
| 3,013,930 | 12/1961 | Serbin | 156—502 X |
| 3,021,947 | 2/1962 | Sylvester et al. | 206—57 |

FRANKLIN T. GARRETT, *Primary Examiner.*

EARL M. BERGERT, DOUGLAS J. DRUMMOND,
*Examiners.*